(12) United States Patent
DeFlumere et al.

(10) Patent No.: US 8,900,890 B2
(45) Date of Patent: Dec. 2, 2014

(54) CORNER CUBE ENHANCED PHOTOCATHODE

(71) Applicant: BAE Systems Information and Electronic Systems Integration Inc., Nashua, NH (US)

(72) Inventors: Michael E. DeFlumere, Woburn, MA (US); Paul W. Schoeck, Townsend, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 14/045,888

(22) Filed: Oct. 4, 2013

(65) Prior Publication Data
US 2014/0034813 A1 Feb. 6, 2014

Related U.S. Application Data

(62) Division of application No. 12/935,261, filed on Sep. 28, 2010, now Pat. No. 8,581,228.

(60) Provisional application No. 61/146,501, filed on Jan. 22, 2009.

(51) Int. Cl.
| | |
|---|---|
| *H01J 29/06* | (2006.01) |
| *G02B 5/122* | (2006.01) |
| *G01J 1/44* | (2006.01) |
| *H01J 9/12* | (2006.01) |

(52) U.S. Cl.
CPC . *G01J 1/44* (2013.01); *G02B 5/122* (2013.01); *H01J 9/12* (2013.01)
USPC .......................................................... 438/20

(58) Field of Classification Search
USPC .............. 257/233, 10, 11; 438/10, 20, 22, 48
See application file for complete search history.

(56) References Cited

U.S. PATENT DOCUMENTS

| | | | |
|---|---|---|---|
| 3,586,895 A | 6/1971 | Sowers et al. | |
| 3,688,145 A | 8/1972 | Coles | |

(Continued)

FOREIGN PATENT DOCUMENTS

| | | |
|---|---|---|
| EP | 0202637 A2 | 11/1986 |
| GB | 1529215 A1 | 10/1978 |

(Continued)

OTHER PUBLICATIONS

Extended European Search Report, received for EP Application No. EP18733801, Mailed on Sep. 26, 2012, 5 Pages.

(Continued)

*Primary Examiner* — Nathan Ha
(74) *Attorney, Agent, or Firm* — Finch & Maloney PLLC; Daniel J. Long

(57) ABSTRACT

Techniques are disclosed for improving the quantum efficiency of photocathode devices. The techniques allow for an increase in the optical thickness of the photocathode device, while simultaneously allowing for an increase in the probability of electron escape into the vacuum of the device. The techniques are particularly useful in detector and imaging. In one embodiment, a photocathode device is provided that has an array of corner cubes fabricated in a surface of the photocathode. The corner cube array is made of the same material as the photocathode layer. The device may be, for example, a detector or image intensifier that operates in the UV, visible, and IR light spectrums, and may further include a gain medium, anode, and readout device. Techniques for forming the device are also provided.

11 Claims, 5 Drawing Sheets

(56) References Cited

U.S. PATENT DOCUMENTS

| | | | |
|---|---|---|---|
| 3,812,559 A * | 5/1974 | Spindt et al. | 445/52 |
| 3,852,133 A | 12/1974 | Houston | |
| 4,478,769 A | 10/1984 | Pricone et al. | |
| 4,616,248 A | 10/1986 | Khan et al. | |
| 5,013,902 A | 5/1991 | Allard | |
| 5,461,226 A | 10/1995 | Nicoli et al. | |
| 5,646,479 A | 7/1997 | Troxell | |
| 5,804,833 A | 9/1998 | Stettner et al. | |
| 5,861,707 A | 1/1999 | Kumar | |
| 6,201,257 B1 | 3/2001 | Stettner et al. | |
| 6,540,367 B1 | 4/2003 | Benson et al. | |
| 7,078,702 B2 | 7/2006 | Ringermacher et al. | |
| 7,485,872 B2 * | 2/2009 | Frisch et al. | 250/397 |
| 7,759,755 B2 * | 7/2010 | Adkisson et al. | 257/436 |
| 7,977,747 B2 * | 7/2011 | Allibert et al. | 257/347 |
| 8,003,425 B2 | 8/2011 | Adkisson et al. | |
| 2003/0030014 A1 | 2/2003 | Wieland et al. | |
| 2003/0178583 A1 | 9/2003 | Kampherbeek et al. | |
| 2009/0212221 A1 | 8/2009 | Fest et al. | |
| 2010/0224763 A1 * | 9/2010 | DeFlumere et al. | 250/214 LA |
| 2011/0049365 A1 | 3/2011 | Aebi | |

FOREIGN PATENT DOCUMENTS

| | | | |
|---|---|---|---|
| JP | 09283075 A | 10/1977 | |
| JP | 61267374 A | 11/1986 | |
| JP | 2000030604 A | 1/2000 | |
| JP | 2002184302 A | 6/2002 | |
| WO | 98/13857 A1 | 4/1998 | |

OTHER PUBLICATIONS

PCT Search Report and Written Opinion, PCT/US2010/21485, mailed Mar. 18, 2010, 8 pages.

A video-based spatial-optical system for wireless communication, SPIE, Connecting Minds Advancing Light, printed on Jan. 8, 2010 from website: http://spie.org/x8634.xml?ArticalID=x8634, 4 pages.

Comparative study of GaN and GaAs photocathodes, Quio Jianliang, et al., International Symposium on Photoelectronic Detetection and Imaging 2007: Photoelectronic Imaging and Detection, edited by Liwei Zhou, Proc. of SPIE vol. 6621, 66210K, 2008, 7 pages.

The Photocathode of the Image Intensifier, Standford Computer Optics, Inc., Image intensifier: the photocathode, 2009, printed on Dec. 29, 2009 from website: http://stanfordcomputeroptics.com/t-image-intensifier_photocathode.html, 1 page.

Photocthode—Wikipedia, the free encyclopedia, printed on Jan. 10, 2010 from website: http://en.wikipedia.org/wiki/Photocathode, 2 pages.

Molecular Expressions Microscopy Primer: Digital Imaging in Optical Microscopy, Concepts in Digital Imaging Technology, Photomultiplier Tubes, printed on Dec. 29, 2009 from website: http://micro.magnet.fsu.edu/primer/digitalimaging/concepts/photomultipliers.html, 3 pages.

Molecular Expressions Microscopy Primer: Digital Imaging in Optical Microscopy, Concepts in Digital Imaging Technology, Proximity-Focused Image Intensifiers, printed on Dec. 29, 2009 from website: http://micro.magnet.fsu.edu/primer/digitalimaging/concepts/proximity.html, 4 pages.

Optical Properties of Cesium Telluride, P. Michelato, et al., INFN Milano—LASA, Segrate, I-20090, Italy, Proceedings of EPAC 2002, Paris, France, pp. 1810-1812.

ScienceDirect—Microelectronic Engineering: Nanopatterning of organic and inorganic materials by holographic lithography and plasma etching, P. Viscontia et al., Microelectronic Engineering, vol. 53, Issues 1-4, Jun. 2000, pp. 391-394.

Precision crystal corner cube arrays for optical gratings formed by (100) silicon planes with selective epitaxial growth, Gerold W. Neudeck, et al., Applied Optics, vol. 35, No. 19, Jul. 1, 1996, 5 pages.

Delila, Development of Lithography Technology for Nanoscale Structuring of Materials Using Laser Beam Interference, Shizhong Su et al., Feb. 13, 2006, 2 pages (pp. 1 and 23 of 66 page document).

* cited by examiner

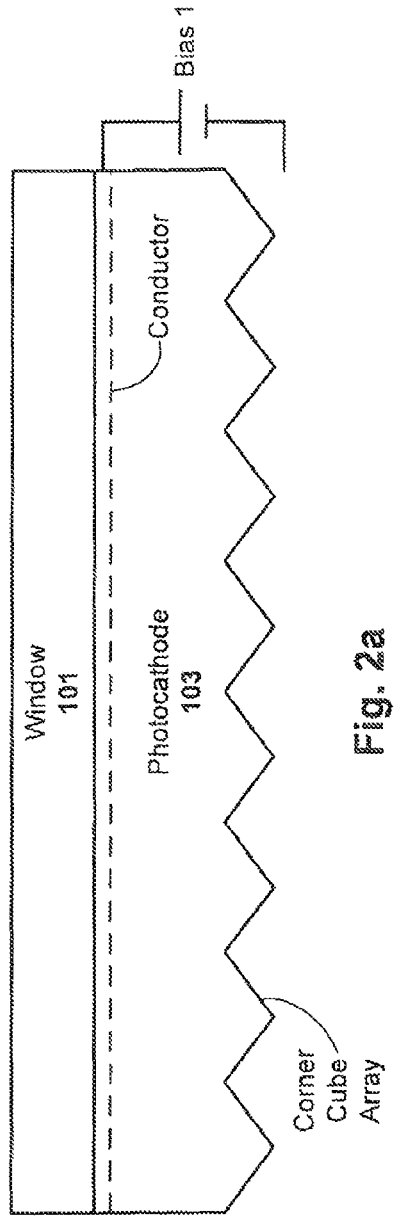
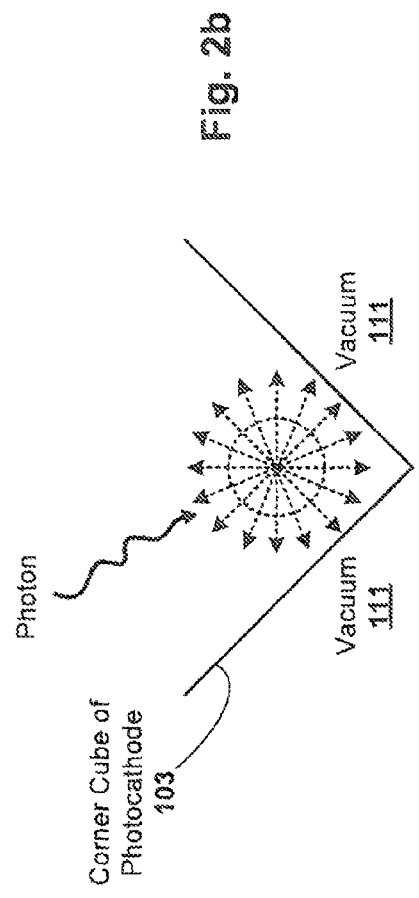

CORNER CUBE ENHANCED PHOTOCATHODE

RELATED APPLICATIONS

This application is a divisional of U.S. application Ser. No. 12/935,261 filed Sep. 28, 2010 and claims the benefit of U.S. Provisional Application No. 61/146,501, filed Jan. 22, 2009, which is herein incorporated by reference in its entirety.

FIELD OF THE INVENTION

The invention relates to photo-emissive devices, and more particularly, to techniques for improving the quantum efficiency of such devices.

BACKGROUND OF THE INVENTION

As is known, a photocathode is a negatively charged electrode in a light detection device, such as a phototube or photomultiplier. The electrode is coated with a photosensitive material, such that when light impinges on the photosensitive material, the absorbed energy causes electron emission due to the photoelectric effect. Current photocathode designs are typically planar and have not structurally changed since the early phototubes.

Photo-emissive devices generally have limited quantum efficiency due to a number of non-trivial issues.

SUMMARY

One embodiment of the present invention provides a photocathode device. The device includes a window (transparent to spectrum range of interest), and a photocathode layer. The photocathode layer has an input surface optically coupled to the window and a vacuum-side surface having a corner cube array formed therein. The corner cube array is made of the same material as the photocathode layer. The device may further include a gain medium operatively coupled to the vacuum-side surface via a vacuum and bias, and an anode operatively coupled to the gain medium by the vacuum. In one such case, the device may further include a readout device operatively coupled to the anode. In another such case, the gain medium includes a microchannel plate. In another such case, the gain medium includes a photomultiplier tube. In one specific example case, the photocathode comprises gallium nitride or cesium telluride. In another specific case, the corner cube array includes corner cubes having a height in the range of 150 nm or less (from the top of the corner cube to the base on the corner cube). In another specific case, the corner cube array includes corner cubes having a square format.

Another embodiment of the present invention provides a method for making a photocathode device. The method includes providing a window, and optically coupling a photocathode layer to the window by an input surface of the photocathode layer. The method further includes forming a corner cube array on a vacuum-side surface of the photocathode layer, the corner cube array being made of the same material as the photocathode layer. The method may further include operatively coupling a gain medium to the vacuum-side surface via a vacuum and bias, and operatively coupling an anode to the gain medium by the vacuum. In one such case, the method further includes operatively coupling a readout device to the anode. In another such case, the gain medium includes a microchannel plate or a photomultiplier tube. In one specific example case, the photocathode comprises gallium nitride or cesium telluride. In another specific case, the corner cube array includes corner cubes having a height in the range of 150 nm or less. In another specific case, the corner cube array includes corner cubes having a square format. In another specific case, the photocathode layer is formed on the window prior to forming the corner cube array on a vacuum-side surface of the photocathode layer. In another specific case, forming a corner cube array on a vacuum-side surface of the photocathode layer is carried out by forming the photocathode layer on a mandrel configured with a corner cube pattern having dimensions corresponding to desired dimensions of the corner cube array. In one such case, optically coupling the photocathode layer to the window is carried out after forming the corner cube array.

A number of variations will be apparent in light of this disclosure. For instance, another embodiment of the present invention provides a photocathode device. In this example embodiment, the device includes a window, and a photocathode layer having an input surface optically coupled to the window and a vacuum-side surface having a corner cube array formed therein. The corner cube array is made of the same material as the photocathode layer, and includes corner cubes having a square format and a height in the range of 150 nm or less. The device further includes a gain medium operatively coupled to the vacuum-side surface via a vacuum and bias, an anode operatively coupled to the gain medium by the vacuum, and a readout device operatively coupled to the anode. In one such case, the gain medium includes a microchannel plate or a photomultiplier tube, and the photocathode comprises gallium nitride or cesium telluride.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 2a is a schematic drawing of a corner cube enhanced photocathode, configured in accordance with one embodiment of the present invention.

FIG. 2b illustrates how the direction of photoelectrons is distributed over a sphere and how a corner cube enhanced photocathode provides more surface to escape to vacuum of detector, in accordance with one embodiment of the present invention.

DETAILED DESCRIPTION

Figure 1:
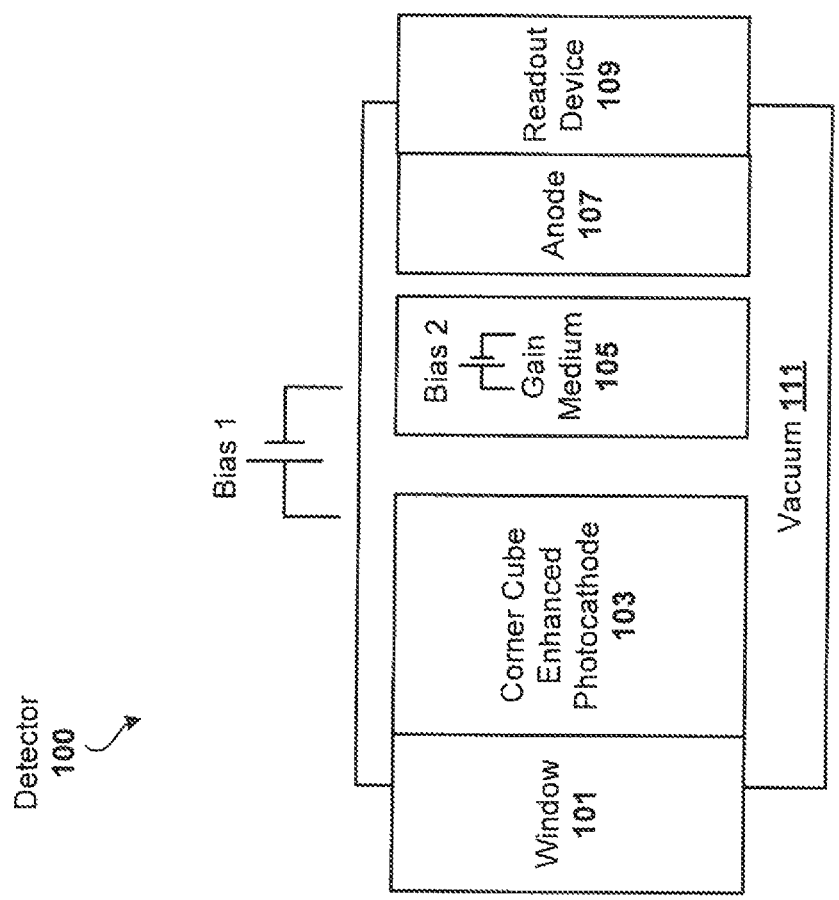
FIG. 1 illustrates a detector configured in accordance with an embodiment of the present invention.

Techniques are disclosed for improving the quantum efficiency of photocathode devices. The techniques allow for an increase in the optical thickness of the photocathode device, while simultaneously allowing for an increase in the probability of electron escape into the vacuum of the device. The techniques are particularly useful in detector and imaging systems that operate in the ultra-violet (UV), visible, and infrared (IR) light spectrums, such as those implemented as low light level systems.

General Overview

As previously explained, conventional photo-emissive devices have limited quantum efficiency. One reason for this limited quantum efficiency is due to conflicting design requirements. In particular, for a high probability of photoelectron generation, the photocathode should be optically thick. On the other hand, for a high probability that a photoelectron will escape into the vacuum of the detector, the photocathode should be physically thin.

In standard operation, incoming light or photons pass through an entrance window and impinge upon the photocathode. The photocathode converts the incoming photons to photoelectrons by lifting an electron from the valance band to the conduction band. To obtain a maximum signal to noise ratio (SNR) in images generated by a photocathode-based detector/imager, the spectral sensitivity of the photocathode can be tailored to the light spectrum of the given application. In general, for higher SNR, a higher the number of photons converted to electrons is required meaning higher quantum efficiency.

The spectral response, quantum efficiency (sensitivity), and dark current of a photocathode device are effectively determined by the composition of the photocathode. Conventional photocathodes capable of responding to UV light typically have a quantum efficiency of about 20% or less. This means that 80% or more of the photons impinging on the photocathode do not produce a photoelectron, and are thus not detected. Photocathode thickness can be set to obtain the desired response from absorbed photons. If the photocathode is too thick, more impinging photons will be absorbed but fewer electrons will be emitted from the photocathode output. On the other hand, if the photocathode is too thin, then too many impinging photons will pass through without being absorbed and converted to electrons.

Thus, and in accordance with an embodiment of the present invention, a photocathode device is provided that has a relatively high quantum efficiency (relative to conventional photocathode devices) by simultaneously increasing the optical thickness and probability of escape into the vacuum (output) of the device. In one such embodiment, an array of corner cubes is fabricated on a surface of the photocathode. Corner cubes have a unique property of returning any incoming optical rays back along the same input path. Ray displacement is negligible due to the relatively small size of the corner cube (e.g., nano-scale). This arrangement effectively doubles (or more) the optical thickness of the photocathode without increasing the physical thickness. Also the structure of the corner cubes increases the exit surface area of the photocathode (relative to a conventional planar photocathode surface), thereby increasing the probability of escape (higher electron output) into the device vacuum for detection.

Detector System

FIG. 1 illustrates a detector system 100 configured in accordance with an embodiment of the present invention. As can be seen, the system 100 includes window 101, corner cube enhanced photocathode 103, gain medium 105, anode 107, and readout device 109. Each of the photocathode 103, gain medium 105, and anode 107 are included in a vacuum 111. In addition, in this example embodiment, a portion of the window 101 and the readout device 109 are also included in the vacuum 111. A bias (bias 1) is applied between the conductor of the photocathode 103 and the input of the gain medium 105, as typically done. Such a system can be used, for example, for any number of detection and/or image intensifier applications such as night vision, surveillance, or other such applications based on light reflection or emission.

The window 101 can be implemented with conventional technology, and operates to provide scene data from an optical imaging system over the system's field of view (FOV) to the photocathode 103. The window 101 can be, for example, the substrate upon which the photocathode 103 is grown or otherwise formed using, for instance, standard epitaxial growth and lithography (e.g., pattern mask and etch). Alternatively, the window 101 can be formed or otherwise provided separately, and then bonded to the separately formed corner cube enhanced photocathode 103. Bonding can be achieved, for instance, by way of mechanical (e.g., glue or epoxy that is transparent in the spectrum range of interest), chemical (ionic or covalent bonding), or fusion bonding (cross-linking bond). As will be appreciated, the type of bonding will generally depend on the materials used. The window 101 can be implemented with any material(s) suitable for passing the spectrum range of interest, such as glass, quartz, magnesium fluoride, or other material transparent at the spectrum range. Additional optics may be used in conjunction with the window to provide for collection and/or focusing of incident light, if so desired. The type and complexity of the window and any optics can vary depending on a number of factors including desired performance, acceptance angle, cost, and wavelengths of interest.

In any such cases, photons of interest in the FOV of the system are provided to the photocathode 103 for conversion to electrons via the photoelectric effect. As can be further seen, the photocathode 103 is enhanced in that it includes a corner cube array provided in the vacuum-side surface. The photocathode 103 can generally be implemented with materials suitable for the spectral response range and application of interest. For instance, antimony cesium (SbCs) has a spectral response in the UV to visible wavelength range and can be used in semitransparent or reflection-mode photocathodes. Antimony rubidium cesium (SbRbCs) or antimony potassium cesium (SbKCs) each have a spectral response range similar to a SbCs photocathode, but with higher sensitivity and relatively lower dark current, and are commonly used in scintillation counters. Photocathodes made with sodium potassium antimony (NaKSb) also tend to operate with very low dark current, and are suitable for use in photon counting applications. Photocathodes made with sodium potassium antimony-cesium (NaKSbCs) exhibit a spectral response from the UV to near IR wavelength regions, and are commonly used for broadband spectrophotometers and photon counting applications. The wavelength response can be extended (e.g., to 930 nm) by photocathode activation processing. Gallium nitride (GaN) and Gallium arsenide (GaAs) photocathode materials can be used in detecting UV and IR wavelengths, respectively. Indium gallium arsenide (InGaAs) photocathodes exhibit extended sensitivity in the IR range compared to GaAs. Photocathodes made from cesium telluride or cesium iodide (CsTe or CsI, respectively) are sensitive to vacuum UV and UV rays but not to visible light (CsTe is insensitive to wavelengths longer than 320 nm, and CsI is insensitive to wavelengths longer than 200 nm). Additional details of the corner cube enhanced photocathode 103 will be provided with reference to FIGS. 2a-5.

An electron output by the photocathode 103 is accelerated toward the gain medium 105 due to the bias (Bias 1) between the photocathode 103 and the gain medium 105 input. Bias 1 can be, for example, about 300 VDC or any voltage suitable for negatively biasing the photocathode 103 with respect to the gain medium 105. The gain medium 105 can be implemented, for example, with a microchannel plate (MCP). As is known, an MCP generally includes an array of small diameter tubes or channels, each of which operates as an independent electron multiplier in the presence of a bias (Bias 2) applied across the input and output electrodes of the MCP (e.g., 3000 VDC for a three plate configuration, or other suitable MCP bias). As an electron enters the input end of a given channel and passes through that channel, it impacts the channel walls thereby producing secondary electrons that then also propagate through the channel and impact the channel wall to produce even more secondary electrons. This repetitive addition of electrons amplifies the original input signal, and the resulting electron cloud is provided at the output of the MCP. Once the channel of the MCP outputs the electron cloud, that channel is depleted of charge, and thus needs to recharge to as to be ready for the next event in the channel. The bias (Bias 2) recharges the channel through the resistance of the plate.

Various other embodiments and configurations will be apparent. For instance, note that two or more MCPs can be coupled in series to provide even greater amplification for a given input event, as is sometimes done. For instance, an assembly of two MCPs (sometimes called a Chevron or V-stack), or three MCPs (sometimes called a Z-stack) may be used in place of single MCP. In short, any number of MCPs can be used and configured in accordance with an embodiment of the present invention, and the number of MCPs required will depend on demands and various particulars of the target application. Each MCP in the stack can be configured individually with dynamic charging switches. Alternatively, the channels of the individual MCPs in the stack can be precisely aligned to effectively provide single long channels that run through the stack. In such cases, the last MCP in the stack can be configured with dynamic charging switches, just as if there were only one MCP.

The anode 107 operatively couples the gain medium 105 to the readout device 109, and can be implemented, for example, with conventional technology such as with an array of anode pads (e.g., aluminum or gold pads formed on a silicon substrate, or a printed circuit board, or other suitable substrate) that effectively pixelizes the output of the gain medium 105, with each pad connected to an amplifier circuit of the readout device 109. Alternatively, the anode 107 can be implemented with an optical taper, which typically involves a conversion from electrons to light at the output of the gain medium 105 using a phosphor. In another example embodiment, the anode 107 can be implemented with an interface as described in U.S. application Ser. No. 12/400,505 filed on Mar. 9, 2009, which is herein incorporated in its entirety by reference. The interface described there can be used to interface a segmented anode 107 to a readout device 109 using at least one interconnect layer for physically connecting each anode pad to a corresponding readout circuit pad. In one such case, the interface transfers signals from a relatively large anode pad array of to a smaller array of the readout circuit. Each interconnect layer provides conductive runs, vias, and/or metal contacts that operatively couple anode pads to corresponding interconnect pads/bumps of readout device 109. The number of middle interconnect layers depends on factors such as the number of pixels included in the array of the detector system as well as the fabrication techniques employed (which effectively define geometries and feature sizes of the resulting circuitry). Thus, the anode 107 can be directly or indirectly connected to the readout device 109 (e.g., by way of similar pad layouts and geometries associated with both the anode 107 and readout device 109, or by way of an optical taper or one or more interconnect layers for configurations where the anode pad configuration is different from the readout device pad configuration).

A gap is provided between the output of the gain medium 105 and the anode 107. The gap is generally small (e.g., on the order of 0.2 mm to 0.4 mm), within good design practice, to minimize the spreading of the electron cloud (or output of the gain medium 105) on the anode 107. Note that in a segmented anode configuration where the gain medium 105 is implemented with an MCP, each anode pad receives a detection signal from a corresponding channel of the MCP. Such a multi-anode MCP configuration is particularly useful when it is necessary to maintain spatial relationships of input signals (e.g., such as the case with imaging applications). Other embodiments may have an anode 107 configured with a single (non-segmented) anode (effectively, a single pixel) that collects the total current produced by all the MCP channels.

The readout device 109 can be implemented with conventional technology. For instance, in one example case, the readout circuit 109 is implemented with an amplifier for each pixel of the anode 107, to amplify the detection signal strength to a desired level (e.g., to microvolt or millivolt scale). The readout circuit 109 may further include filtering (e.g., bandpass or other suitable signal shaping) and/or analog to digital conversion (e.g., to 8-bit or 16-bit resolution), to prepare each amplified detection signal for subsequent processing/use (e.g., image analysis, discrimination, etc). In any case, the readout circuit 109 can be secured to the pads (or pad) of anode 107 using conventional technology, such as bump bonding. In a segmented anode configuration, each anode pad/readout circuit pad pair effectively corresponds to a pixel of the detector 100. Thus, the readout device 109 receives each pixel/detection signal and converts it into a signal having qualities suitable for subsequent signal processing.

Other embodiments may have a gain medium 105 other than an MCP. For example, a conventional photomultiplier tube (PMT) can be used to provide the gain medium 105. In one such configuration, a PMT using a dynode chain or an imaging phototube that relies on high voltage between the photocathode 103 and phosphor of anode 107. Such a photomultiplier tube approach can also use an embedded readout circuit 109 if the anode 107 is made to produce additional electrons by impact of the photoelectrons which have been accelerated by the high voltage bias (Bias 2). This process is generally referred to as impact ionization.

Corner Cube Enhanced Photocathode

FIG. 2a is a schematic drawing of a corner cube enhanced photocathode, configured in accordance with one embodiment of the present invention. As can be seen, the window 101 is provided on the input/incident surface of the photocathode 103, and a corner cube array is provided as part of the output/vacuum surface of the photocathode 103. The array of corner cubes can be, for example, grown, machined, or otherwise formed in the vacuum-side surface of the photocathode 103, which as previously explained, can be deposited on an appropriate window 101 for the operational wavelength of the device 100. The photocathode further includes a conductor as typically done, to allow for application of Bias 1 to facilitate escape of photoelectrons to vacuum 111.

In one embodiment, a mandrel is nano-machined to produce a corner cube pattern with dimensions corresponding to the desired dimensions of the corner cubes in the array. In one such case, the photocathode 103 (including the corner cube array) can be grown or otherwise formed on the mandrel, thereby imparting the corner cube pattern of the mandrel onto a surface of the photocathode being formed. The mandrel material can be selected, for example, to facilitate nanomachining and lift-off of the corner cube photocathode 103, and to not interfere with growth/formation of the photocathode 103. In a more general sense, the mandrel is made from a material that does not bond or otherwise react with the material making up the corner cube array. The mandrel can be, for example, made from titanium or steel or other suitable non-reactive metal, semiconductor, and ceramic materials. In such cases, the photocathode 103 material (including the corner cube array) can be, for example, GaN or CsTe. Numerous material schemes will be apparent in light of this disclosure for implementing the mandrel and photocathode 103. After the growth/formation process is complete, the window 101 can be optically contacted to photocathode 103, and both can be lifted off the mandrel. In such an embodiment, note that attaching the window 101 while the photocathode 103 is still on the mandrel provides a degree of rigidity that both facilitates lift-off of the assembly from the mandrel and further protects the machined photocathode 103. The window-photocathode assembly can be used with other components of the detector device as discussed with reference to FIG. 1.

In another embodiment, the photocathode 103 is formed on the window 101, and the array of corner cubes is then formed on the top surface of the photocathode 103. Standard photolithography can be used to form the corner cube array in the photocathode 103 layer. For instance, a mask having the desired corner cube format can be patterned on the vacuum-side surface of the photocathode 103 (e.g. using reactive ion etching to transfer a multidimensional photoresist pattern on to the photocathode). The pattern can then be imparted onto the vacuum-side surface of the photocathode 103 by standard etching (e.g., wet or plasma etch). In one specific such embodiment, the corner cube mask patterning and formation can be carried out, for example, using UV holographic lithography and plasma etching. Holographic lithography can be used for patterning arrays of fine features such as corner cubes. An interference pattern between two or more coherent light waves is setup and effectively recorded in a photoresist layer. This interference pattern includes a periodic series of fringes representing intensity minima and maxima. Once the pattern is exposed per standard photolithographic processing, a photoresist pattern corresponding to the periodic intensity pattern is provided. For a two-beam interference pattern, the fringe-to-fringe spacing or period is given by $[\lambda/2]/\sin[\theta/2]$, where $\lambda$ is the wavelength and $\theta$ is the angle between the two interfering waves. As such, the minimum period is one-half the wavelength $\lambda$. As will be appreciated, by using a three-beam interference pattern, arrays with hexagonal symmetry can be provided, and by using a four-beam interference pattern, arrays with rectangular symmetry can be provided. Thus, superimposing different beam combinations allows for different corner cube formats to be defined.

In operation, and in accordance with an embodiment of the present invention, photons enter the photocathode 103 within an F-cone and field distribution that are determined by the optical system in front of the window 101. After a first pass through the photocathode 103, the photons that do not generate electrons are returned along their original path by a corner cube included in the array. As will be appreciated in light of this disclosure, this arrangement has a number of important benefits. In particular, the photons now have a second chance to be converted thereby increasing the quantum efficiency. In addition, the fact that the photons are returned on the same path (with only a small or otherwise negligible displacement) means that the optical resolution of the system (detector modulation transfer function, or MTF) is preserved. Moreover, recall that the corner cubes are fabricated from the same material as the photocathode 103 and therefore further improve quantum efficiency. The corner cubes also provide most of the optical thickness of the photocathode 103. Furthermore, the electrons that are generated in the corner cube have a higher probability of escaping to the vacuum 111 due to the larger surface area provided. In more detail, and as illustrated in FIG. 2b, the electrons that are generated with initial directions that are evenly distributed over a sphere (given the natural statistical probability of an even distribution) have a better chance of exiting into the vacuum 111 than they would have with a planar photocathode. This is because the electrons are more likely to reach a vacuum-side edge in a corner cube enhanced photocathode 103.

The corner cube array dramatically increases the quantum efficiency of any photocathode 103. The ideal photocathode will absorb all photons and emit all generated photoelectrons within the absorption band of the material used for the photocathode. Typical photocathode quantum efficiencies range from a few percent to as much as 50%. The techniques described herein can be used to generally improve quantum efficiency by a factor of two, and particularly for photocathode-based detector devices that operate in the UV, visible and IR spectral ranges. In more detail, quantum efficiency is determined by a number of factors, including the absorption cross-section of the photocathode material, path length in that material, electron mean free path, and negative electron affinity (NEA) of the surface. The absorption cross-section and mean free path are functions of the material used, and the NEA is in general can be achieved, for instance, by cesium processing the surface. The techniques provided herein can be used to improve quantum efficiency by increasing the path length by at least a factor of 2, and also reduce the distance an electron travels to the vacuum surface by the structure of the corner cube. As will be appreciated, the quantum efficiency enhancement described herein can be applied to any detector material used as a photocathode. The photocathode materials selected can generally be an alloy or compound of materials selected to obtain the desired spectral shape. In some embodiments, the photocathode layer thicknesses are in the range of tens of nanometers (e.g., 30 nm) to hundreds of nanometers (e.g., 300 nm). As nanotechnology progresses, feature sizes (e.g., layer thickness, corner cube dimensions, etc) may continue to decrease.

In one specific embodiment, a GaN photocathode 103 is selected for operation in the UV portion of the spectrum. The thickness of the photocathode 103 can be, for example, in the range of 100 nm to 250 nm. The corner cubes may have dimensions on the nano-scale as well. For instance, and with reference to FIG. 3, an example corner cube is configured with a circular format, having a diameter and a height. In some embodiments, the diameter can be, for example, in the range of 100 nm to 500 nm, and the height can be, for example, in the range of 30 to 250 nm.

Figure 3:
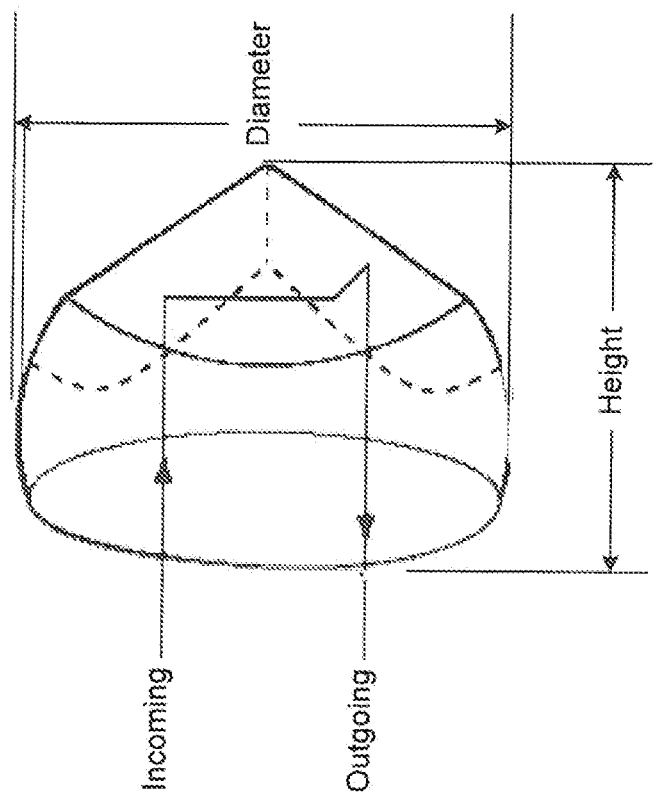
FIG. 3 illustrates a photon propagating through a corner cube configured in accordance with one embodiment of the present invention.

As will be appreciated, numerous other corner cube formats and geometries can be used here, and the claimed invention is not intended to be limited to any particular configuration. For example, while a circular corner cube format can be used as shown in FIG. 3, such a configuration will have a fill factor loss for an array that covers the area of the photocathode 103. In embodiments where a higher fill factor is desired, a square corner cube format can be used, thereby providing a 100% fill factor (or close thereto). The dimensions of the square corner cubes can be, for instance, in the range of 100 nm to 250 nm. In addition, typical detector and image intensifiers are generally configured as either an 18 mm and 25 mm type. However, larger photocathode devices (e.g., 500 mm)

can be made as well. In any such cases, note that the corner cube techniques provided herein can be scaled to any active area needed.

As previously explained, the optical path through the photocathode material is more than doubled given the nature of the corner cube. Conventional configurations do not allow for this. For example, one conventional photocathode configuration employs a fiber bundle having the fiber ends terminating in truncated corner cubes. The corner cubes are coated with a photocathode material. One significant issue associated with this conventional approach is that electrons are generated at the surface of the photocathode material and will have reduced probability of exit to the vacuum-side. In contrast, techniques provided herein allow for increased path length within the photocathode material (as opposed to multiple reflections from the fiber optic and photocathode interface). Another issue associated with the conventional fiber bundle approach is the resolution of the image is limited by the size of fiber optics, which are typically not smaller than the micron scale (e.g., 3 microns or greater). In contrast, a corner cube array as described herein can be implemented on the nano-scale. Another advantage of making the corner cubes out of the photocathode material as described herein is the increased probability of photoelectrons reaching the vacuum interface and having sufficient energy to exit to the vacuum. In short, the corner cube provides multiple paths to the vacuum.

Formation Methodology—Mandrel

Figure 4:
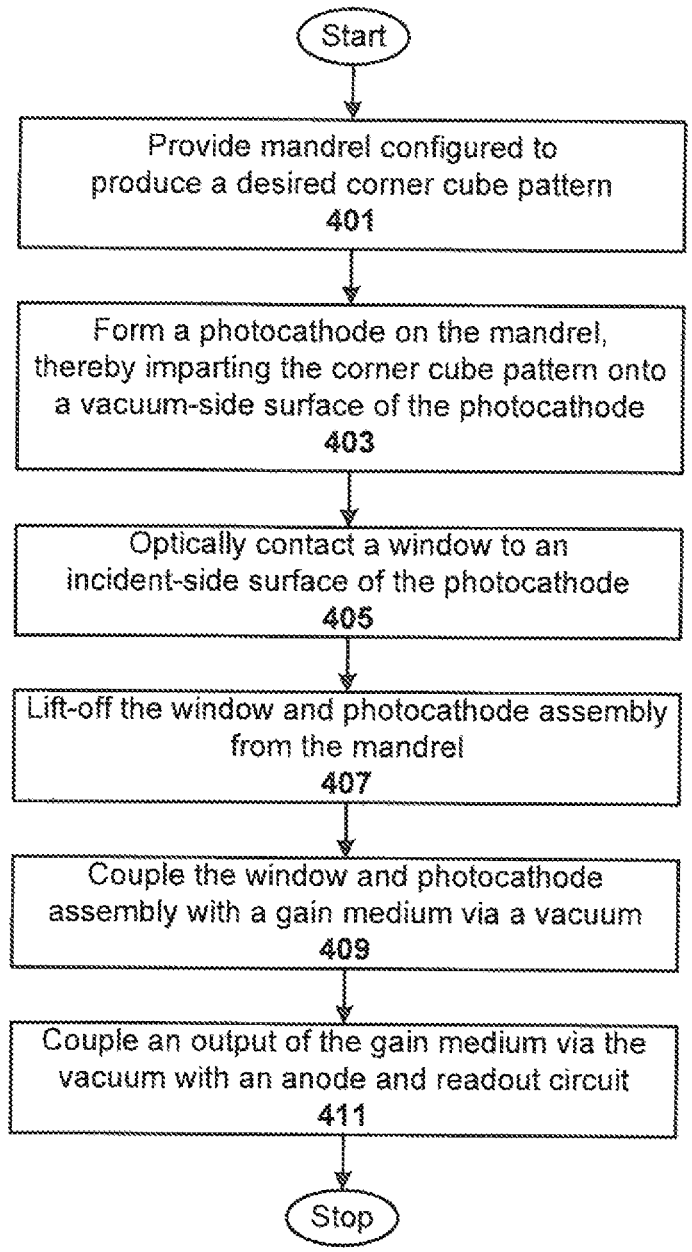
FIG. 4 illustrates a method for fabricating a corner cube enhanced photocathode device, in accordance with one embodiment of the present invention.

FIG. 4 illustrates a method for fabricating a corner cube enhanced photocathode device, in accordance with one embodiment of the present invention. The device has an array of corner cubes fabricated on an internal surface, and in particular, on the vacuum-side surface of the photocathode layer. The corner cube array is part of the photocathode layer and as such is the same material. After a first pass through the photocathode, photons that do not generate electrons are returned along their original paths by one of the corner cubes thereby improving quantum efficiency.

The method includes providing 401 a mandrel configured to produce a desired corner cube pattern. As previously explained, the corner cube pattern can be implemented with any number of corner cube formats (e.g., triangular, square, etc) and feature sizes (e.g., nano-scale, micro-scale, etc). The method continues with forming 403 a photocathode on the mandrel, thereby imparting the corner cube pattern onto a vacuum-side surface of the photocathode. The photocathode can be any number of suitable photo emissive materials (e.g., III-V material systems such as GaN or GaAs, or CeTe). As previously explained, the mandrel is made from a material that does not bond or otherwise react with the material making up the photocathode.

The method continues with optically contacting 405 a window to an incident-side surface of the photocathode. The window is generally transparent to the spectrum range of interest. As will be appreciated, the incident-side surface of the photocathode is the surface upon which incoming photons will impinge. As previously explained, bonding can be achieved, for instance, by way of mechanical, chemical, or fusion bonding, and additional optics may be used in conjunction with the window to provide for collection and/or focusing of incident light.

The method continues with lifting-off 407 the window and photocathode assembly from the mandrel. This lift-off can be achieved, for example, using a push-stick or actuator (e.g., pneumatic or hydraulic mechanism that lifts or otherwise pushed the assembly from the mandrel). The method continues with coupling 409 the window and photocathode assembly with a gain medium (e.g., MCP, etc) via a vacuum, and coupling 411 an output of the gain medium via the vacuum with an anode and readout circuit. As previously explained, the anode and readout circuit can be implemented as an integrated circuit or discrete components.

Formation Methodology—Lithography

Figure 5:
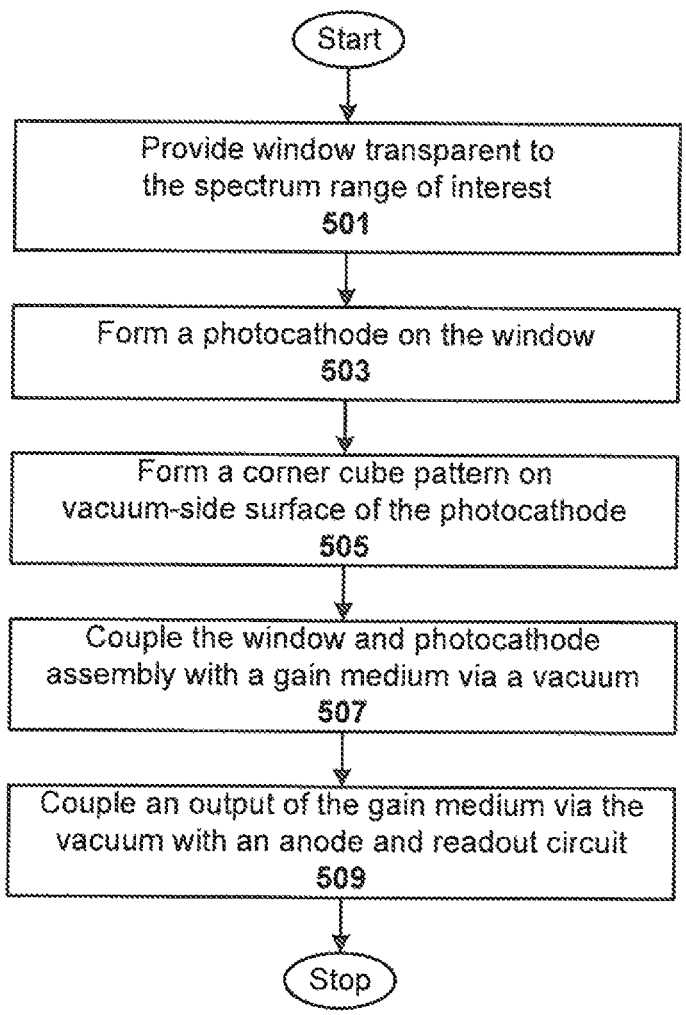
FIG. 5 illustrates a method for fabricating a corner cube enhanced photocathode device, in accordance with another embodiment of the present invention.

FIG. 5 illustrates a method for fabricating a corner cube enhanced photocathode device, in accordance with another embodiment of the present invention. This embodiment can be used as an alternative to the one previously discussed with reference to FIG. 4, where rather than using a mandrel to form the corner cube array, standard photolithography is used.

The method includes providing 501 a window that is transparent to the spectrum range of interest, and then forming 503 a photocathode on the window. The photocathode can be grown or otherwise formed, for example, using any suitable deposition techniques, such as chemical vapor deposition, vapor phase epitaxy, molecular beam epitaxy, and/or liquid phase epitaxy. Any number of conventional techniques can be used in forming the photocathode on the window.

The method continues with forming 505 a corner cube pattern on the vacuum-side surface of the photocathode. As previously explained, the corner cube array can be formed using standard photolithography technique. In one specific embodiment, the corner cube array is formed using UV holographic lithography and plasma etching. The method continues is a similar fashion as discussed with reference to FIG. 4, with coupling 409 the window and photocathode assembly with a gain medium (e.g., MCP, etc) via a vacuum, and coupling 411 an output of the gain medium via the vacuum with an anode and readout circuit.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for making a photocathode device, comprising:
   providing a window;
   forming a reflector array on a vacuum-side surface of a photocathode layer, carried out by forming the photocathode layer on a mandrel configured with reflector array pattern having dimensions corresponding to desired dimensions of the reflector array, the reflector array being made of the same material as the photocathode layer; and
   optically coupling the photocathode layer to the window by an input surface of the photocathode layer after forming the reflector array.

2. The method of claim 1 further comprising:
   operatively coupling a gain medium to the vacuum-side surface via a vacuum and bias; and
   operatively coupling an anode to the gain medium by the vacuum.

3. The method of claim 2 further comprising:
   operatively coupling a readout device to the anode.

4. The method of claim 2 wherein the gain medium includes a microchannel plate or a photomultiplier tube.

5. The method of claim 1 wherein the photocathode comprises gallium nitride or cesium telluride.

6. The method of claim 1 wherein the reflector array includes reflectors having a height in the range of 150 nm or less.

7. The method of claim 1 wherein the reflector array includes reflectors having a square format.

8. The method of claim 1 wherein the reflector array includes reflectors having a square format and a height in the range of 150 nm or less.

9. The method of claim 1, wherein optically coupling the photocathode layer to the window includes bonding the photocathode layer to the window.

10. A photocathode device, comprising:
   a window;
   a photocathode layer having an input surface optically coupled by a bonded connection to the window and a vacuum-side surface having array formed therein, the array being made of the same material as the photocathode layer and having been formed on a mandrel configured with a reflector pattern having dimensions corresponding to desired dimensions of the reflector array, wherein the reflector array includes reflectors having a square format and a height in the range of 150 nm or less;
   a gain medium operatively coupled to the vacuum-side surface via a vacuum and bias;
   an anode operatively coupled to the gain medium by the vacuum; and
   a readout device operatively coupled to the anode.

11. The photocathode device of claim 10 wherein the gain medium includes a microchannel plate or a photomultiplier tube, and the photocathode comprises gallium nitride or cesium telluride.

\* \* \* \* \*